United States Patent
Neville et al.

(10) Patent No.: US 8,217,337 B2
(45) Date of Patent: Jul. 10, 2012

(54) EVALUATING A RESERVOIR FORMATION

(75) Inventors: Thomas J. Neville, Wellesley, MA (US); Sherif Farag, Ho Chi Minh (VN); Huijun Hou, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 645 days.

(21) Appl. No.: 12/398,413

(22) Filed: Mar. 5, 2009

(65) Prior Publication Data

US 2009/0248309 A1 Oct. 1, 2009

Related U.S. Application Data

(60) Provisional application No. 61/040,589, filed on Mar. 28, 2008.

(51) Int. Cl.
*G01V 5/00* (2006.01)
*G01V 5/04* (2006.01)
*G01V 3/00* (2006.01)

(52) U.S. Cl. ............. 250/254; 250/256; 702/8; 324/303

(58) Field of Classification Search .................. 250/254, 250/269.6, 266, 269.7, 256, 267, 268, 269.4; 702/8; 324/303
See application file for complete search history.

(56) References Cited

U.S. PATENT DOCUMENTS

| | | | |
|---|---|---|---|
| 5,471,057 A | | 11/1995 | Herron |
| 7,538,319 B2 * | | 5/2009 | Jacobi et al. ............... 250/269.6 |
| 8,024,122 B2 * | | 9/2011 | LeCompte et al. ............... 702/8 |
| 2007/0246649 A1 * | | 10/2007 | Jacobi et al. ............... 250/269.6 |

OTHER PUBLICATIONS

GuoXin, L., et al., Computing Gas-in-Place in a Complex Volcanic Reservoir in China, Society of Petroleum Engineers, SPE 103790, Dec. 5-7, 2006, pp. 1-12 (12 pages).

Freedman, R., et al., Combining NMR and Density Logs for Petrophysical Analysis in Gas-Bearing Formations, 1998, pp. 1-18 (18 pages).

McKeon, D. C. and Scott, H. D., SNUPAR—A Nuclear Parameter Code for Nuclear Geophysics Applications, IEEE Transactions on Nuclear Science, Feb. 1989, pp. 1215-1219 (5 pages).

Hertzog, R., et al., Geochemical Logging with Spectrometry Tools, Society Petroleum Engineers, SPE 16792, Sep. 27-30, 1987, pp. 447-460 (14 pages).

Herron, S. L. and Herron, M. M., Application of Nuclear Spectroscopy Logs to the Derivation of Formation Martrix Density, Presented at the 41st Annual Logging Symposium of the Society of Professional Well Log Analysts, Jun. 4-7, 2000, pp. 1-12 (12 pages).

(Continued)

*Primary Examiner* — David Porta
*Assistant Examiner* — Faye Boosalis
(74) *Attorney, Agent, or Firm* — Colin L. Wier

(57) ABSTRACT

In general, in one aspect, the invention relates to a method for evaluating a volcanic reservoir formation having volcanic rock forming elements and a borehole penetrating the volcanic reservoir formation. The method includes controlling chlorine concentration in an environment of the borehole and a tool operation to enable neutron capture spectroscopy measurements of the volcanic rock forming elements, obtaining neutron capture spectroscopy data relating to the volcanic rock forming elements from borehole logging tools, determining a lithology of the volcanic reservoir formation based on at least the neutron capture spectroscopy data, and generating an evaluation of the volcanic reservoir formation based on at least the lithology.

20 Claims, 9 Drawing Sheets

OTHER PUBLICATIONS

Timur, A., An Investigation of Permeability, Porosity, & Residual Water Saturation Relationships for Sandstone Reservoirs, Chevron Research Company, Jul.-Aug. 1968, pp. 8-17 (10 pages).

Kleinberg, R. L., Utility of NMR T2 Distributions, Connection with Capillary Pressure, Clay Effect, and Determination of the Surface Relaxivity Parameter p2, Magnetic Resonance Imaging, 1996, pp. 761-767 (7 pages).

* cited by examiner

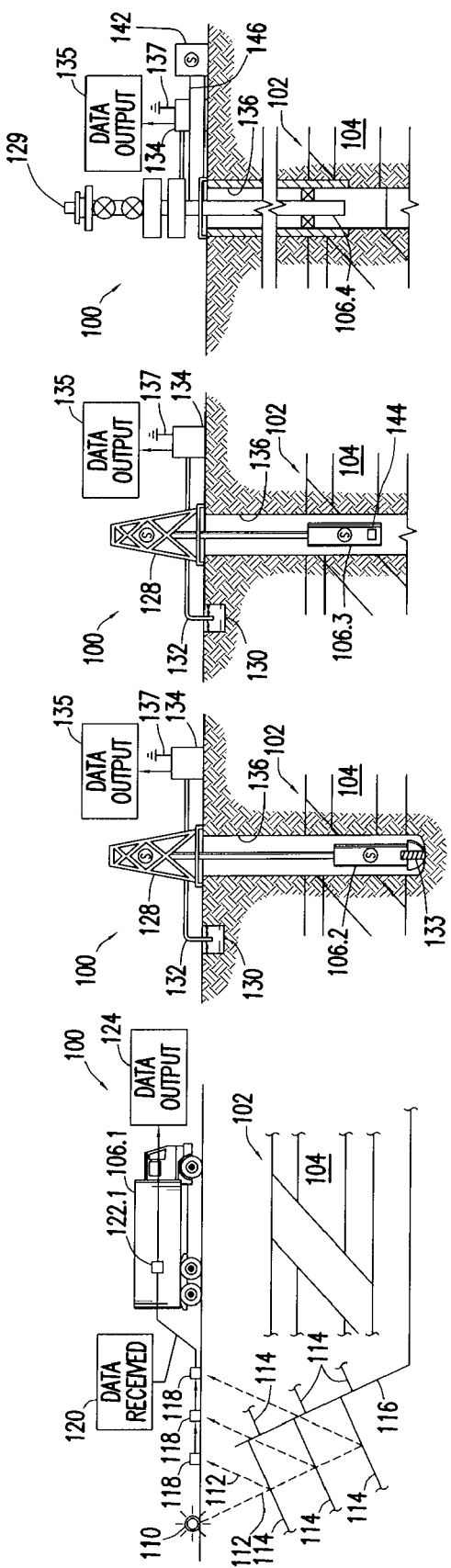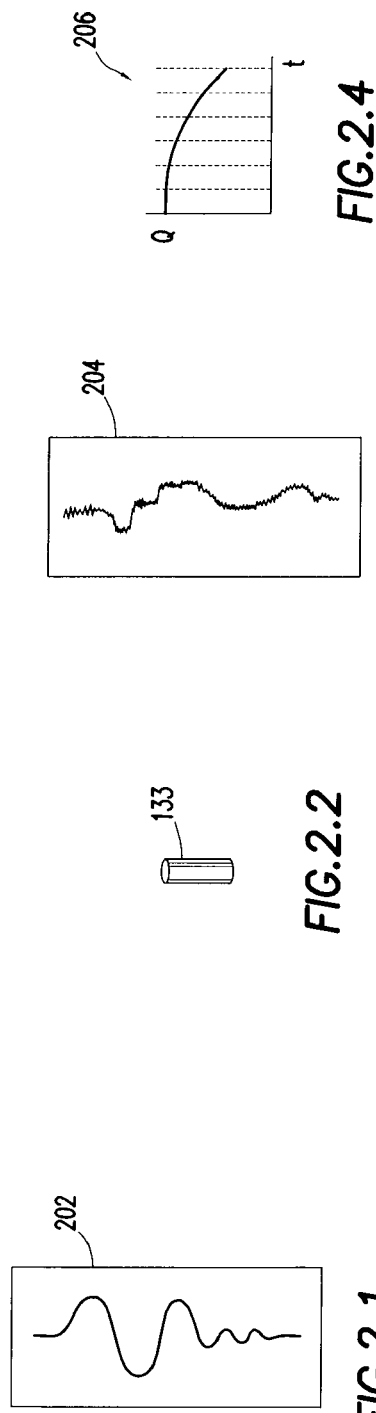

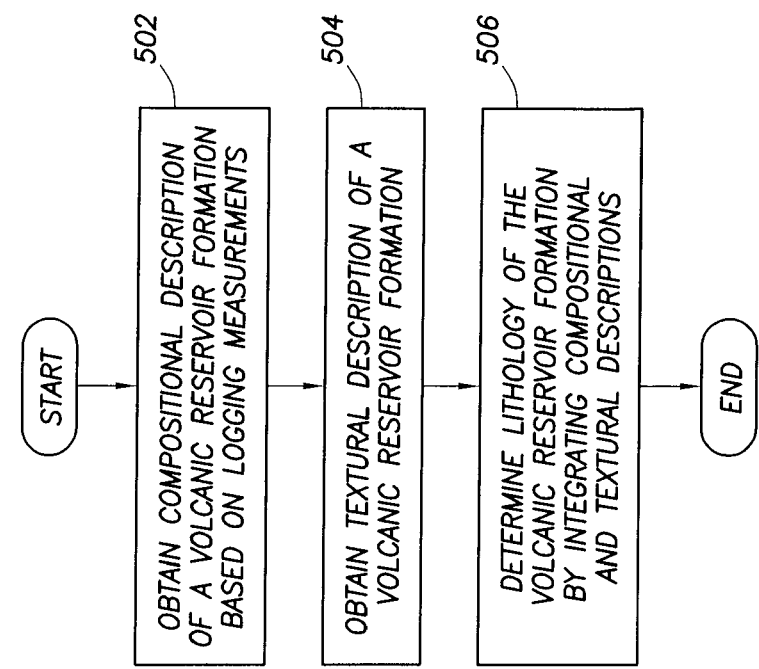
FIG.5.2
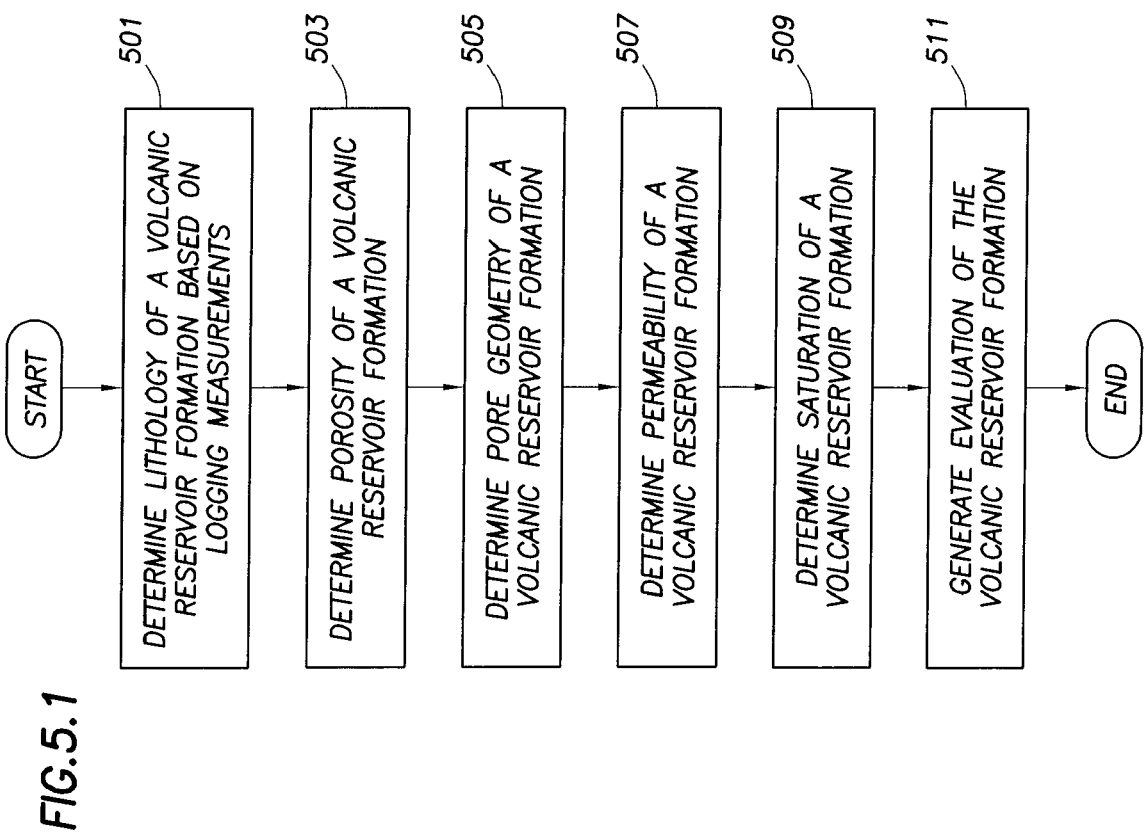
FIG.5.1

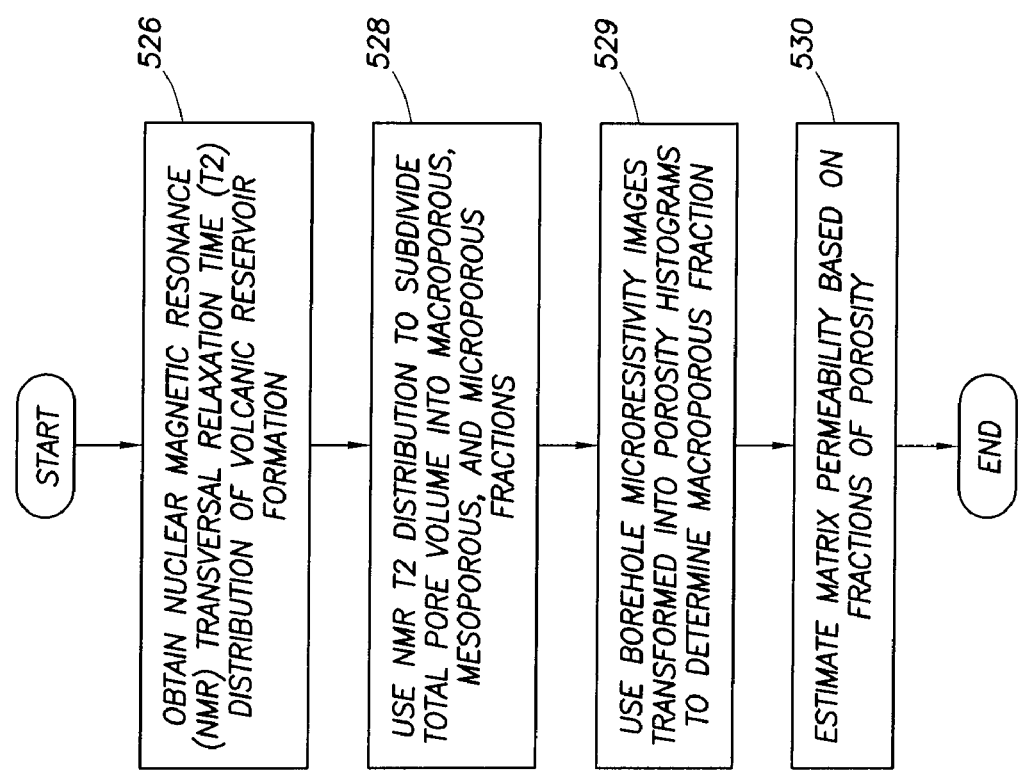
FIG.5.5
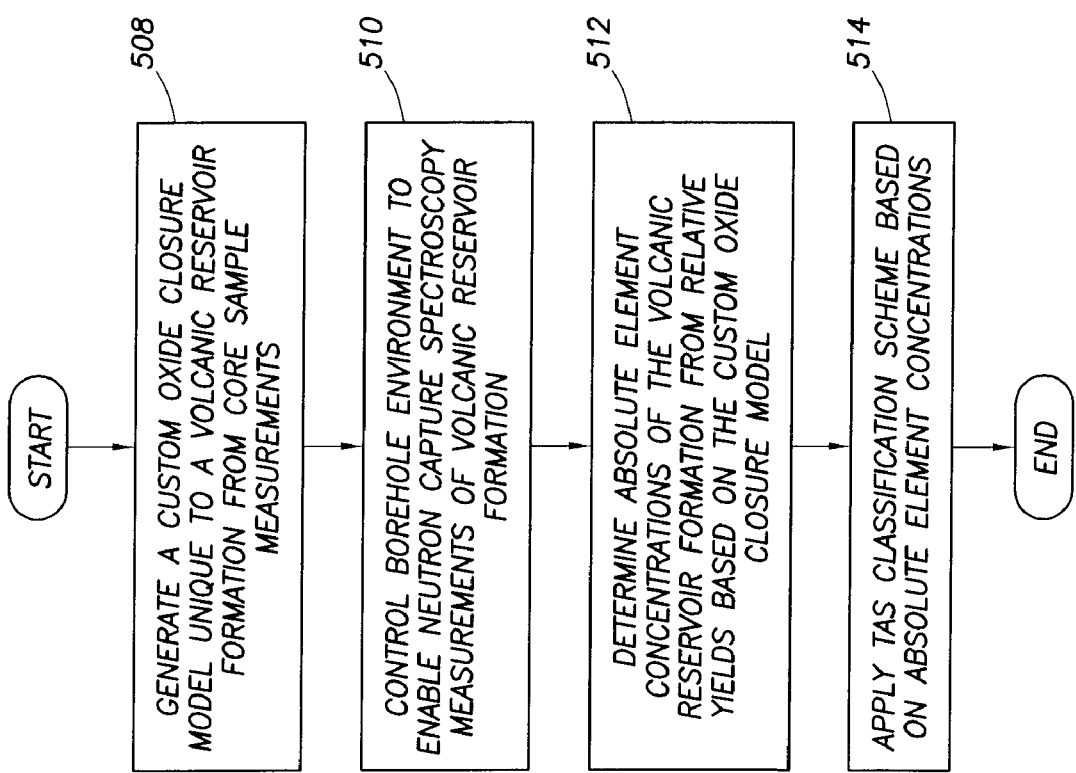
FIG.5.3

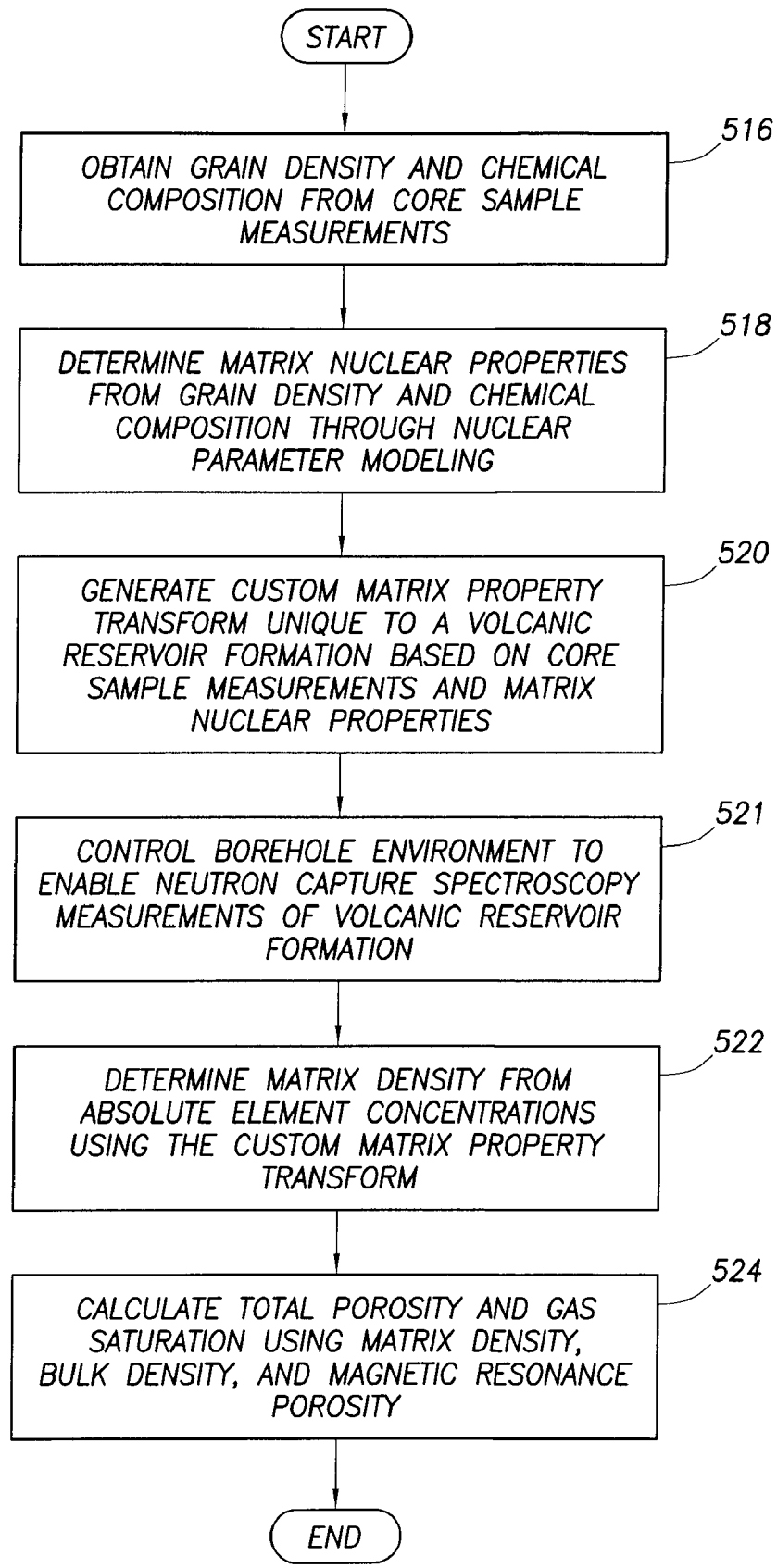
FIG.5.4

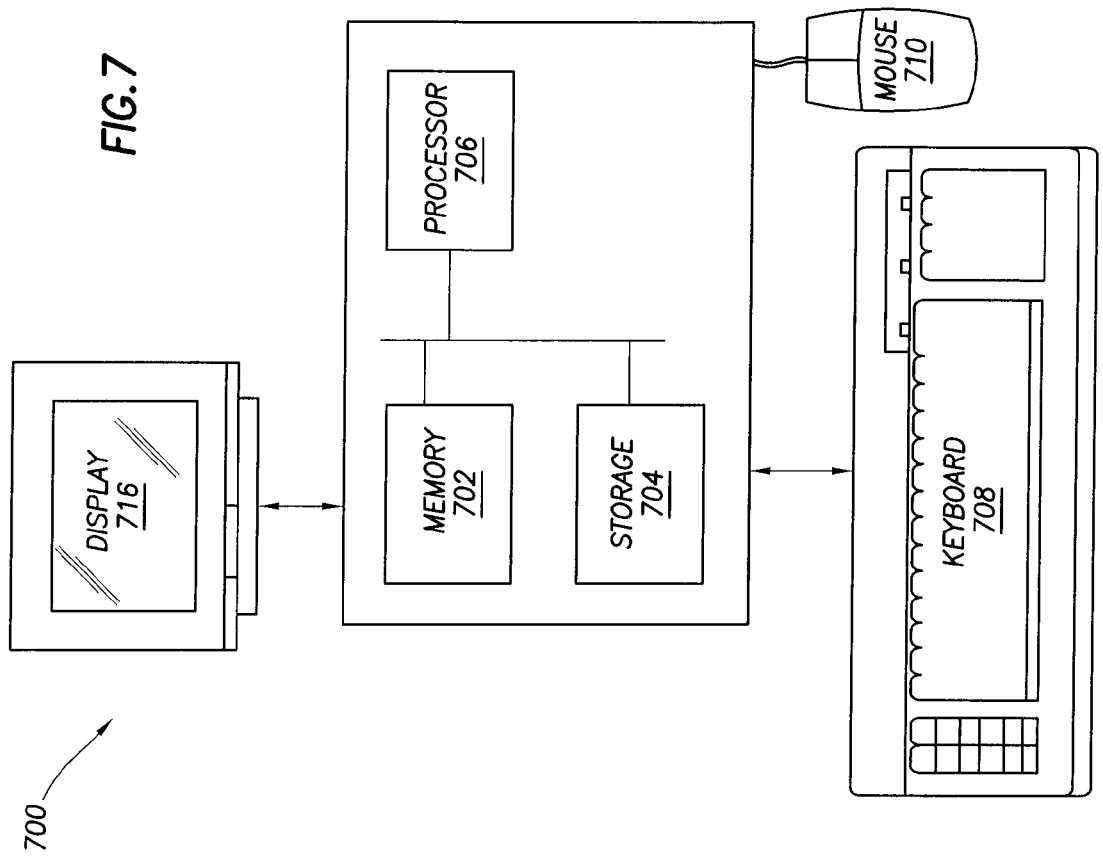
FIG. 7
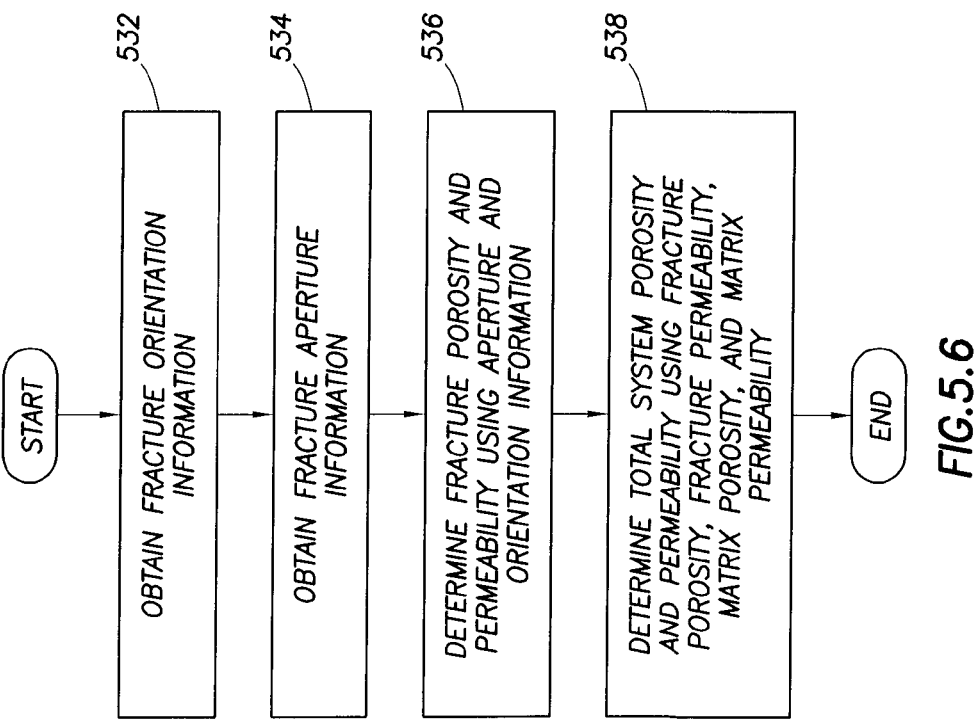
FIG. 5.6

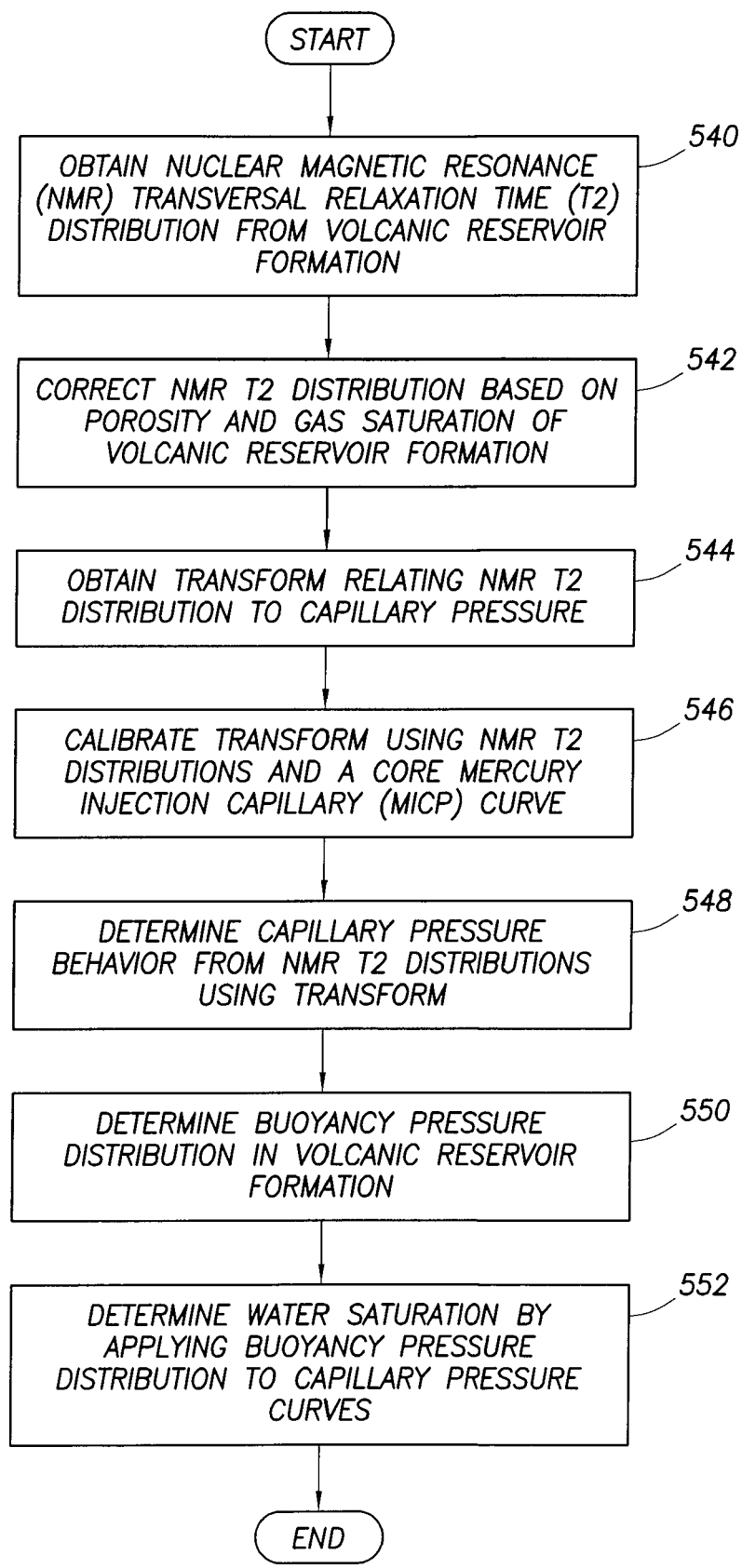
FIG.5.7

EVALUATING A RESERVOIR FORMATION

CROSS REFERENCE TO RELATED APPLICATIONS

This application claims priority under 35 U.S.C. §119(e) from Provisional Patent Application No. 61/040,589 filed Mar. 28, 2008, entitled "System and Method for Evaluating A Reservoir Formation" which is hereby incorporated by reference in its entirety.

BACKGROUND

As the development of conventional gas accumulations has matured, less conventional sources are gaining in importance. Globally, volcanic rocks have the potential to host significant gas accumulations that have been historically overlooked. For example, gas has been encountered in volcanic rocks of the YingCheng Group in the SongLiao Basin in the vicinity of the Daqing Oilfield in China as early as the 1970's. However, due to both the difficult drilling and production environment and the challenging reservoir geology, exploitation of these reserves had not been pursued upon their initial discovery.

Volcanic reservoirs are very complex and present problematic features of the two main classes of reservoir-siliciclastics and carbonates-making for a very challenging interpretation environment. They are also relatively under-studied and there is almost no standard methodology for formation evaluation in such environments. Volcanic rocks are variable in terms of composition, with mineralogy much more complex and varied than that commonly encountered in sedimentary rocks. The complex and variable mineralogy makes the determination of matrix properties (e.g., matrix density) and hence porosity very challenging. Further if the reservoir is also hydrocarbon gas, rather than oil bearing, porosity estimation is even more complicated due to a detrimental influence from the presence of gas on most measurements used in porosity computation.

Elemental concentrations in an underground formation may be determined by irradiating the formation with neutrons, detecting the gamma ray spectrum arising from neutron capture by the formation and analyzing the spectrum to determine elemental concentrations. However, due to the complex and variable mineralogy and chemical composition in a volcanic reservoir formation, this prior method has not been applicable in evaluating the volcanic reservoir formation.

While the rock matrix of these volcanic reservoirs is similar to complex siliciclastics (e.g., sandstone or shale), the pore network may have more in common with carbonate reservoirs. Depending on the type of volcanic rock present, pore systems will be dominantly microporous, however zones of brecciation, weathering, and leaching can show a full spectrum of pore types ranging from microporous through macroporous. In massive volcanic rocks, fractures may represent the only porosity.

The complexity of the pore network geometry may render estimation of permeability from wireline log data difficult. The process of determining saturation from resistivity measurements in these reservoirs is challenging. On the one hand, the complex pore network geometry described above raises large uncertainty in terms of the appropriate Archie parameter values to be used, and their variability. On the other hand, diagenesis of the complex mineral assemblage originally forming these rocks has lead to the formation of various clay minerals or other mineral species such as zeolites; all of these contribute to excess conductivity effects that suppress resistivity response to hydrocarbons, analogous to the classical shaley sand problem.

SUMMARY

In general, in one aspect, the invention relates to a method for evaluating a volcanic reservoir formation having volcanic rock forming elements and a borehole penetrating the volcanic reservoir formation. The method includes controlling chlorine concentration in an environment of the borehole and a tool operation to enable neutron capture spectroscopy measurements of the volcanic rock forming elements, obtaining neutron capture spectroscopy data relating to the volcanic rock forming elements from borehole logging tools, determining a lithology of the volcanic reservoir formation based on at least the neutron capture spectroscopy data, and generating an evaluation of the volcanic reservoir formation based on at least the lithology.

Other aspects of the visualizing region growing in 3D voxel volumes will be apparent from the following description and the appended claims.

BRIEF DESCRIPTION OF DRAWINGS

The accompanying drawings, described below, illustrate typical embodiments of evaluating a reservoir formation and are not to be considered limiting of the scope of evaluating a reservoir formation, for evaluating a reservoir formation may admit to other equally effective embodiments. The figures are not necessarily to scale, and certain features and certain views of the figures may be shown exaggerated in scale or in schematic in the interest of clarity and conciseness.

FIGS. 1.1-1.4 show a schematic view of an oilfield having subterranean structures containing reservoirs therein, various oilfield operations being performed on the oilfield.

FIGS. 2.1-2.4 show graphical depictions of data collected by the tools of FIGS. 1.1-1.4, respectively.

FIGS. 5.1-5.7 show flowcharts in accordance with one or more embodiments of evaluating a reservoir formation.

FIG. 7 shows a computer system in accordance with one or more embodiments of evaluating a reservoir formation.

DETAILED DESCRIPTION

Figure 3:
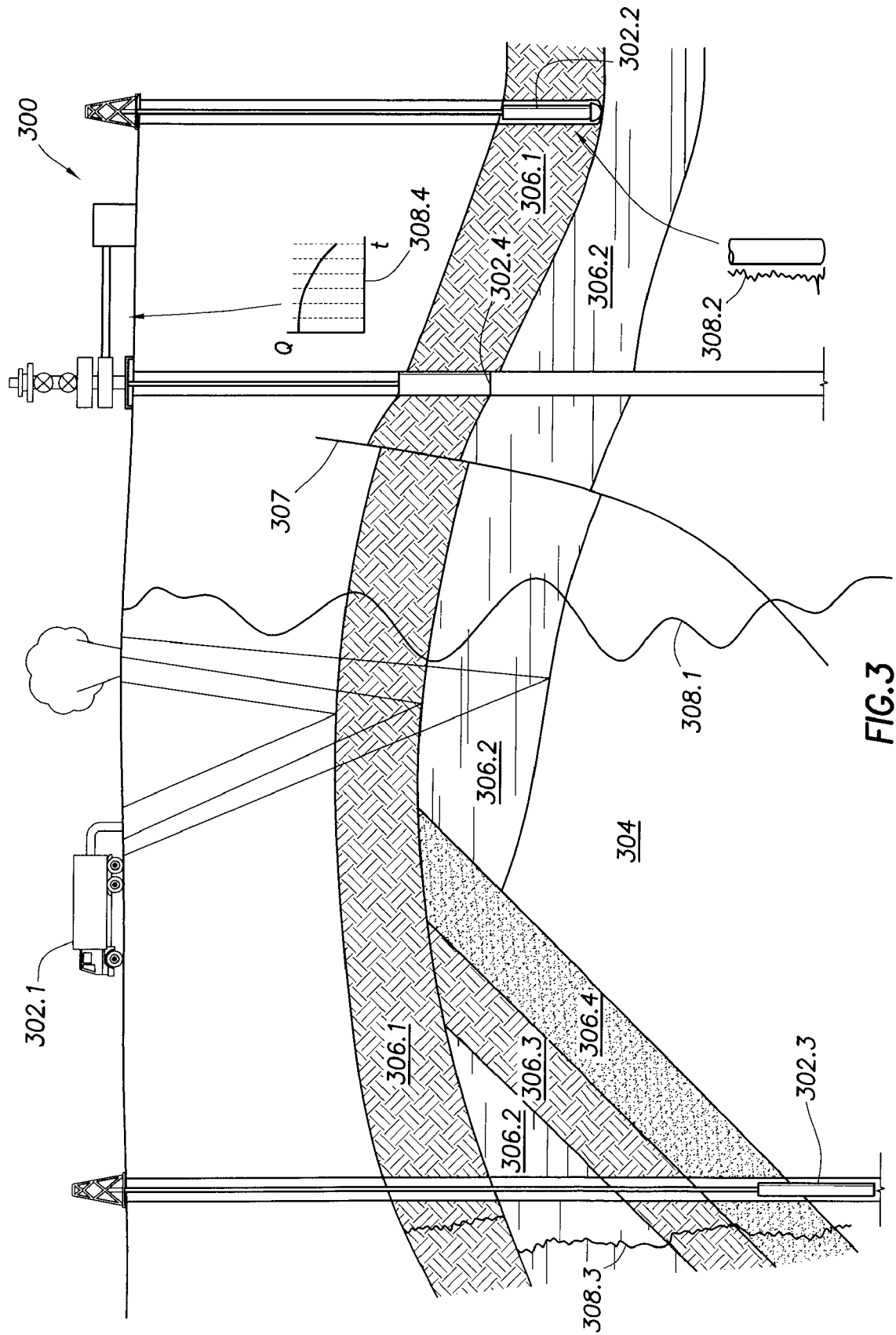
FIG. 3 shows a schematic view, partially in cross-section of an oilfield having data acquisition tools.

Specific embodiments of evaluating a reservoir formation will now be described in detail with reference to the accompanying figures. Like elements in the various figures are denoted by like reference numerals for consistency.

In the following detailed description of embodiments of evaluating a reservoir formation, numerous specific details are set forth in order to provide a more thorough understanding of evaluating a reservoir formation. In other instances, well-known features have not been described in detail to avoid obscuring evaluating a reservoir formation.

In general, evaluating a reservoir formation relates generally to the integration of optimized processes for data acquisition combined with customized interpretation methods embodied in software tools for the evaluation of subsurface volcanic reservoir formations.

FIGS. 1.1-1.4 illustrate an example oilfield (100) with subterranean structures and geological structures therein. More specifically, FIGS. 1.1-1.4 depict schematic views of an oilfield (100) having subterranean structures (102) containing a reservoir (104) therein and depicting various oilfield operations being performed on the oilfield (100). Various measurements of the subterranean formation are taken by different tools at the same location. These measurements may be used to generate information about the formation and/or the geological structures and/or fluids contained therein.

FIG. 1.1 depicts a survey operation being performed by a seismic truck (106.1) to measure properties of the subterranean formation. The survey operation is a seismic survey operation for producing sound vibrations. In FIG. 1.1, an acoustic source (110) produces sound vibrations (112) that reflect off a plurality of horizons (114) in an earth formation (116). The sound vibration(s) (112) is (are) received in by sensors, such as geophone-receivers (118), situated on the earth's surface, and the geophones (118) produce electrical output signals, referred to as data received (120) in FIG. 1.1.

The received sound vibration(s) (112) are representative of different parameters (such as amplitude and/or frequency). The data received (120) is provided as input data to a computer (122.1) of the seismic recording truck (106.1), and responsive to the input data, the recording truck computer (122.1) generates a seismic data output record (124). The seismic data may be further processed, as desired, for example by data reduction.

FIG. 1.2 depicts a drilling operation being performed by a drilling tool (106.2) suspended by a rig (128) and advanced into the subterranean formation (102) to form a wellbore (136). A mud pit (130) is used to draw drilling mud into the drilling tool via a flow line (132) for circulating drilling mud through the drilling tool and back to the surface. The drilling tool is advanced into the formation to reach the reservoir (104). The drilling tool may be adapted for measuring downhole properties. The logging while drilling tool may also be adapted for taking a core sample (133) as shown, or removed so that a core sample (133) may be taken using another tool.

A surface unit (134) is used to communicate with the drilling tool and offsite operations. The surface unit (134) is capable of communicating with the drilling tool (106.2) to send commands to drive the drilling tool (106.2), and to receive data therefrom. The surface unit (134) may be provided with computer facilities for receiving, storing, processing, and analyzing data from the oilfield (100). The surface unit (134) collects data output (135) generated during the drilling operation. Computer facilities, such as those of the surface unit, may be positioned at various locations about the oilfield (100) and/or at remote locations.

Sensors (S), such as gauges, may be positioned throughout the reservoir, rig, oilfield equipment (such as the downhole tool) or other portions of the oilfield (100) for gathering information about various parameters, such as surface parameters, downhole parameters and/or operating conditions. These sensors (S) may measure oilfield parameters, such as weight on bit, torque on bit, pressures, temperatures, flow rates, compositions, measured depth, azimuth, inclination and other parameters of the oilfield operation.

The information gathered by the sensors (S) may be collected by the surface unit (134) and/or other data collection sources for analysis or other processing. The data collected by the sensors (S) may be used alone or in combination with other data. The data may be collected in a database and all or select portions of the data may be selectively used for analyzing and/or predicting oilfield operations of the current and/or other wellbores.

Data outputs from the various sensors (S) positioned about the oilfield (100) may be processed for use. The data may be may be historical data, real time data or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical, and/or reservoir engineering simulations. The reservoir, wellbore, surface, and/or process data may be used to perform reservoir, wellbore, or other production simulations. The data outputs (135) from the oilfield operation may be generated directly from the sensors (S), or after some preprocessing or modeling. These data outputs (135) may act as inputs for further analysis.

The data is collected and stored at the surface unit (134). One or more surface units may be located at the oilfield (100), or linked remotely thereto. The surface unit (134) may be a single unit, or a complex network of units used to perform the necessary data management functions throughout the oilfield (100).

The surface unit (134) may be a manual or automatic system. The surface unit (134) may be operated and/or adjusted by a user.

The surface unit (134) may be provided with a transceiver (137) to allow communications between the surface unit (134) and various portions of the oilfield (100) and/or other locations. The surface unit (134) may also be provided with or functionally linked to a controller for actuating mechanisms at the oilfield (100). The surface unit (134) may then send command signals to the oilfield (100) in response to data received. The surface unit (134) may receive commands via the transceiver or may itself execute commands to the controller. A processor may be provided to analyze the data (locally or remotely) and make the decisions to actuate the controller. In this manner, the oilfield (100) may be selectively adjusted based on the data collected. These adjustments may be made automatically based on computer protocol, or manually by an operator. In some cases, well plans and/or well placement may be adjusted to select optimum operating conditions, or to avoid problems.

FIG. 1.3 depicts a wireline operation being performed by a wireline tool (106.3) suspended by the rig (128) and into the wellbore (136) of FIG. 1.2. The wireline tool (106.3) may be adapted for deployment into a wellbore (136) for performing well logs, performing downhole tests and/or collecting samples. The wireline tool (106.3) may be used to provide another method and apparatus for performing a seismic survey operation. The wireline tool (106.3) of FIG. 1.3 may have an explosive or acoustic energy source (144) that provides seismic signals to the surrounding subterranean formations (102).

The wireline tool (106.3) may be operatively linked to, for example, the geophones (118) stored in the computer (122.1) of the seismic recording truck (106.1) of FIG. 1.1. The wireline tool (106.3) may also provide data to the surface unit (134). As shown data output (135) is generated by the wireline tool (106.3) and collected at the surface. The wireline tool (106.3) may be positioned at various depths in the wellbore (136) to provide a survey of the subterranean formation (102).

FIG. 1.4 depicts a production operation being performed by a production tool (106.4) deployed from a production unit or Christmas tree (129) and into the completed wellbore (136) of FIG.1.3 for drawing fluid from the downhole reservoirs into the surface facilities (142). Fluid flows from reservoir (104) through perforations in the casing (not shown) and into the production tool (106.4) in the wellbore (136) and to the surface facilities (142) via a gathering network (146).

Sensors (S), such as gauges, may be positioned about the oilfield (100) to collect data relating to various oilfield operations as described previously. As shown, the sensor (S) may be positioned in the production tool (106.4) or associated equipment, such as the Christmas tree, gathering network, surface facilities and/or the production facility, to measure fluid parameters, such as fluid composition, flow rates, pressures, temperatures, and/or other parameters of the production operation.

While only simplified wellsite configurations are shown, it will be appreciated that the oilfield (100) may cover a portion of land, sea and/or water locations that hosts one or more wellsites. Production may also include injection wells (not shown) for added recovery. One or more gathering facilities may be operatively connected to one or more of the wellsites for selectively collecting downhole fluids from the wellsite(s).

During the production process, data output (135) may be collected from various sensors (S) and passed to the surface unit (134) and/or processing facilities. This data may be, for example, reservoir data, wellbore data, surface data, and/or process data.

While FIGS. 1.1-1.4 depict monitoring tools used to measure properties of an oilfield (100), it will be appreciated that the tools may be used in connection with non-oilfield operations, such as mines, aquifers or other subterranean facilities. Also, while certain data acquisition tools are depicted, it will be appreciated that various measurement tools capable of sensing properties, such as seismic two-way travel time, density, resistivity, production rate, etc., of the subterranean formation and/or its geological structures may be used. Various sensors (S) may be located at various positions along the subterranean formation and/or the monitoring tools to collect and/or monitor the desired data. Other sources of data may also be provided from offsite locations.

The oilfield configuration of FIGS. 1.1-1.4 is not intended to limit the scope of evaluating a reservoir formation. Part, or all, of the oilfield (100) may be on land and/or sea. Also, while a single oilfield measured at a single location is depicted, evaluating a reservoir formation may be utilized with any combination of one or more oilfields, one or more processing facilities and one or more wellsites.

FIGS. 2.1-2.4 are graphical depictions of data collected by the tools of FIGS. 1.1-1.4, respectively. FIG. 2.1 depicts a seismic trace (202) of the subterranean formation (102) of FIG. 1.1 taken by survey tool (106.1). The seismic trace (202) measures the two-way response over a period of time. FIG. 2.2 depicts a core sample (133) taken by the logging tool (106.2). A core test typically provides a graph of the porosity, permeability, or other physical property of the core sample (133) over the length of the core. FIG. 2.3 depicts a well log (204) of the subterranean formation (102) of FIG. 1.3 taken by the wireline tool (106.3). The wireline log typically provides a measurement of resistivity, density or other physical properties of the formation at various depths. FIG. 2.4 depicts a production decline curve (206) of fluid flowing through the subterranean formation (102) of FIG. 1.4 taken by the production tool (106.4). The production decline curve (206) typically provides the production rate (Q) as a function of time (t).

The respective graphs of FIGS. 2.1-2.3 contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2.4 provides a dynamic measurement of the fluid properties through the wellbore. As the fluid flows through the wellbore, measurements are taken of fluid properties, such as flow rates, pressures, composition, etc. As described below, the static and dynamic measurements may be used to generate models of the subterranean formation to determine characteristics thereof.

The models may be used to create an earth model defining the subsurface conditions. This earth model predicts the structure and its behavior as oilfield operations occur. As new information is gathered, part or all of the earth model may be adjusted.

FIG. 3 is a schematic view, partially in cross section of an oilfield (300) having data acquisition tools (302.1), (302.2), (302.3), and (302.4) positioned at various locations along the oilfield for collecting data of the subterranean formation (304). The data acquisition tools (302.1)-(302.4) may be the same as data acquisition tools (106.1)-(106.4) of FIG. 1, respectively. As shown, the data acquisition tools (302.1)-(302.4) generate data plots or measurements (308.1)-(308.4), respectively.

Data plots (308.1)-(308.3) are examples of static data plots that may be generated by the data acquisition tools (302.1)-(302.4), respectively. Static data plot (308.1) is a seismic two-way response time and may be the same as the seismic trace (202) of FIG. 2.1. Static plot (308.2) is core sample data measured from a core sample of the formation (304), similar to core sample (133) of FIG. 2.2. Static data plot (308.3) is a logging trace, similar to the well log (204) of FIG. 2.3. Data plot (308.4) is a dynamic data plot of the fluid flow rate over time, similar to the graph (206) of FIG. 2.4. Other data may also be collected, such as historical data, user inputs, economic information other measurement data and other parameters of interest.

The subterranean formation (304) has a plurality of geological structures (306.1)-(306.4). In one or more embodiments of evaluating a reservoir formation, the subterranean formation is a volcanic reservoir formation. As shown, the formation (304) has a first formation layer (306.1), a second formation layer (306.2), a third formation layer (306.3), and a fourth formation layer (306.4). In one or more embodiments of evaluating a reservoir formation, the third formation layer (306.3) is a shale layer and the fourth formation layer (306.4) is a sand layer. Those skilled in the art, having the benefit of this detailed description, will appreciate the subterranean formation (304) may have any number of layers. A fault line (307) extends through the formation. The static data acquisition tools may be adapted to measure the formation (304) and detect the characteristics of the geological structures of the formation (304).

While a specific subterranean formation with specific geological structures is depicted, it will be appreciated that the formation may contain a variety of geological structures. Fluid may also be present in various portions of the formation. Each of the measurement devices may be used to measure properties of the formation and/or its underlying structures. While each acquisition tool (e.g., (302.1)-(302.4)) is shown as being in specific locations along the formation, it will be appreciated that one or more types of measurement may be taken at one or more location across one or more oilfields or other locations for comparison and/or analysis. Typically, seismic data displayed in the static data plot (308.1) from the data acquisition tool (302.1) is used by a geophysicist to determine characteristics of the subterranean formation (304). Core data shown in static plot (308.2) and/or log data from the well log (308.3) are typically used by a geologist to determine various characteristics of the geological structures of the subterranean formation (304). Production data from the production graph (308.4) is typically used by the reservoir engineer to determine fluid flow reservoir characteristics. Further, one or more data sets may be visualized simultaneously to provide a broader view of the features of the subterranean formations.

Figure 4:
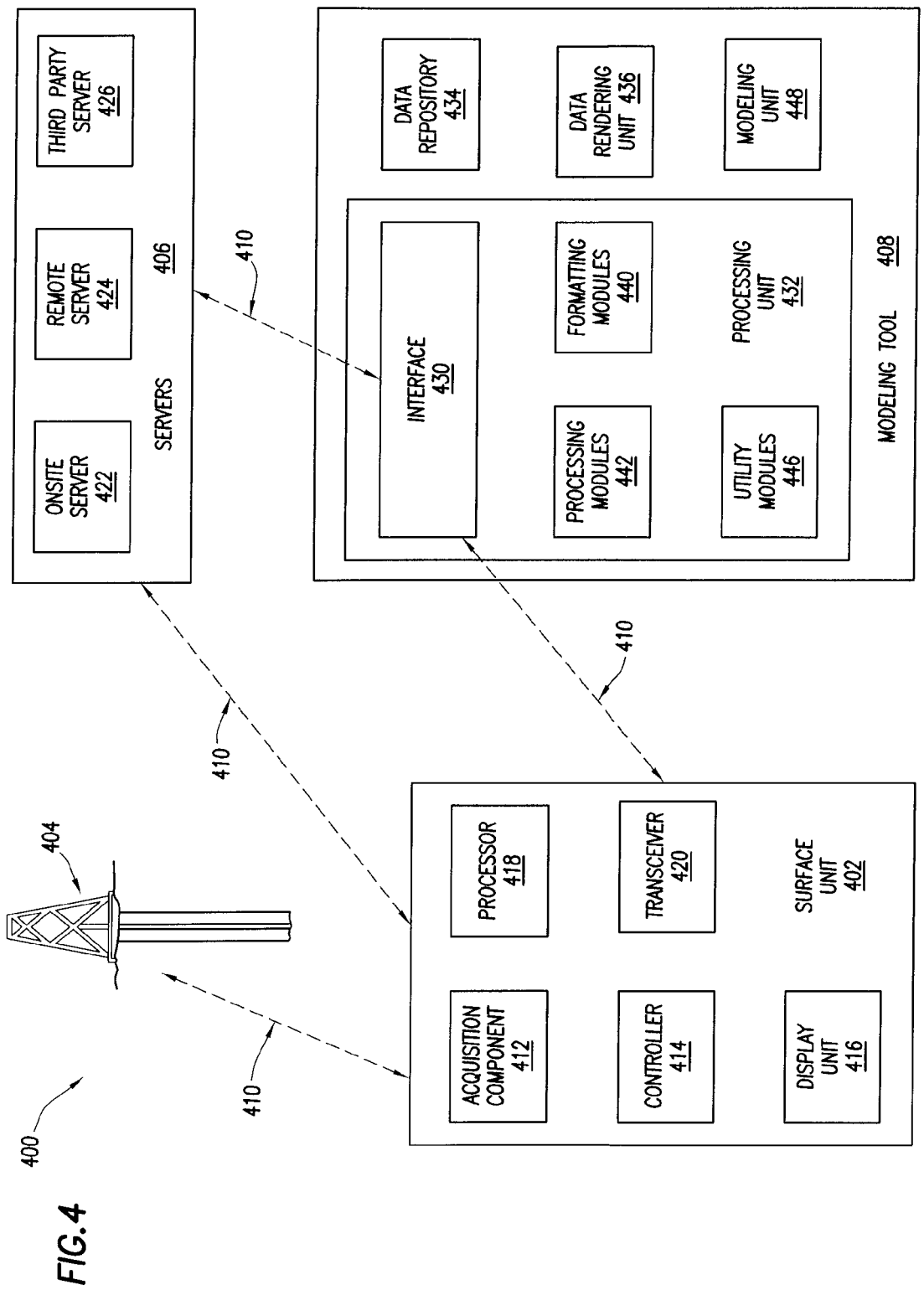
FIG. 4 shows a schematic diagram of a system for performing oilfield operations of an oilfield.

FIG. 4 is a schematic view of a system (400) for performing oilfield operations of an oilfield. As shown, the system (400) includes a surface unit (402) operatively connected to a wellsite drilling system (404), servers (406) operatively linked to the surface unit (402), and a modeling tool (408) operatively linked to the servers (406). As shown, communication links (410) are provided between the wellsite drilling system (404), surface unit (402), servers (406), and modeling tool (408). A variety of links may be provided to facilitate the flow of data through the system. For example, the communication links (410) may provide for continuous, intermittent, one-way, two-way and/or selective communication throughout the system (400). The communication links (410) may be of any type, such as wired, wireless, etc.

The surface unit (402) may be provided with an acquisition component (412), a controller (414), a display unit (416), a processor (418) and a transceiver (420). The acquisition component (412) collects and/or stores data of the oilfield. This data may be data measured by the sensors (S) of the wellsite as described with respect to FIGS. 1.1-1.4. This data may also be data received from other sources.

The controller (414) is enabled to enact commands at the oilfield. The controller (414) may be provided with actuation means that can perform drilling operations, such as steering, advancing, or otherwise taking action at the wellsite. Commands may be generated based on logic of the processor (418), or by commands received from other sources. The processor (418) may be provided with features for manipulating and analyzing the data. The processor (418) may be provided with additional functionality to perform oilfield operations.

A display unit (416) may be provided at the wellsite and/or remote locations for viewing oilfield data (not shown). The oilfield data represented by a display unit (416) may be raw data, processed data and/or data outputs generated from various data. The display unit (416) may be adapted to provide flexible views of the data, so that the screens depicted may be customized as desired. A user may plan, adjust, and/or otherwise perform oilfield operations (e.g., determine the desired course of action during drilling) based on reviewing the displayed oilfield data. The oilfield operations may be selectively adjusted in response to viewing the data on the display unit (416). The display unit (416) may include a two-dimensional (2D) display or a three-dimensional (3D) display for viewing oilfield data or various aspects of the oilfield operations.

The transceiver (420) provides a means for providing data access to and/or from other sources. The transceiver (420) also provides a means for communicating with other components, such as the servers (406), the wellsite drilling system (404), surface unit (402), and/or the modeling tool (408).

The servers (406) may be used to transfer data from one or more wellsites to the modeling tool (408). As shown, the servers (406) include an onsite server (422), a remote server (424), and a third party server (426). The onsite server (422) may be positioned at the wellsite and/or other locations for distributing data from the surface unit. The remote server (424) is positioned at a location away from the oilfield and provides data from remote sources. The third party server (426) may be onsite or remote, but is operated by a third party, such as a client.

The servers (406) may be capable of transferring drilling data, such as logs, drilling events, trajectory, and/or other oilfield data, such as seismic data, historical data, economics data, or other data that may be of use during analysis. The type of server is not intended to limit evaluating a reservoir formation. The system may be adapted to function with any type of server that may be employed.

The servers (406) communicate with the modeling tool (408) as indicated by the communication links (410). As indicated by the multiple arrows, the servers (406) may have separate communication links (410) with the modeling tool (408). One or more of the servers (406) may be combined or linked to provide a combined communication link (410).

The servers (406) collect a wide variety of data. The data may be collected from a variety of channels that provide a certain type of data, such as well logs. The data from the servers is passed to the modeling tool (408) for processing. The servers (406) may also be used to store and/or transfer data.

The modeling tool (408) is operatively linked to the surface unit (402) for receiving data therefrom. In some cases, the modeling tool (408) and/or server(s) (406) may be positioned at the wellsite. The modeling tool (408) and/or server(s) (406) may also be positioned at various locations. The modeling tool (408) may be operatively linked to the surface unit via the server(s) (406). The modeling tool (408) may also be included in or located near the surface unit (402).

The modeling tool (408) includes an interface (430), a processing unit (432), a modeling unit (448), a data repository (434) and a data rendering unit (436). The data collected from various sources may be processed by the processing unit (432) and stored in the data repository (434) as multiple data sets ready to be retrieved for evaluation. The data sets may include a 2D data set, a 3D data set (i.e., 3D volume data set), or other formats known within the art. The interface (430) communicates with other components, such as the servers (406). The interface (430) may also permit communication with other oilfield or non-oilfield sources. The interface (430) receives the data and maps the data for processing. Data from servers (406) typically streams along predefined channels, which may be selected by the interface (430).

As depicted in FIG. 4, the interface (430) selects the data channel of the server(s) (406) and receives the data. The interface (430) also maps the data channels to data from the wellsite. The data may then be passed to the processing modules (442) of the modeling tool (408). The data may be immediately incorporated into the modeling tool (408) for real-time sessions or modeling. The interface (430) creates data requests (for example surveys, logs and/or other volume data sets), displays the user interface, and handles connection state events. The interface (430) also instantiates the data into a data object for processing.

The processing unit (432) includes formatting modules (440), processing modules (442), and utility modules (446). These modules are designed to manipulate the oilfield data for real-time analysis.

The formatting modules (440) are used to conform the data to a desired format for processing. Incoming data may be formatted, translated, converted or otherwise manipulated for use. The formatting modules (440) are configured to enable the data from a variety of sources to be formatted and used so that the data processes and displays in real time.

The utility modules (446) provide support functions to the drilling system. The utility modules (446) include the logging component (not shown) and the user interface (UI) manager component (not shown). The logging component provides a common call for all logging data. This module allows the logging destination to be set by the application. The logging component may also be provided with other features, such as a debugger, a messenger, and a warning system, among others. The debugger sends a debug message to those using the system. The messenger sends information to subsystems, users, and others. The information may or may not interrupt the operation and may be distributed to various locations and/or users throughout the system. The warning system may be used to send error messages and warnings to various locations and/or users throughout the system. In some cases, the warning messages may interrupt the process and display alerts.

The UI manager component creates user interface elements for displays. The UI manager component defines user input screens, such as menu items, context menus, toolbars, and settings windows. The UI manager may also be used to handle events relating to these user input screens.

The processing module (442) is used to analyze the data and generate outputs. As described above, the data may include static data, dynamic data, historic data, real-time data, or other types of data. Further, the data may relate to various aspects of the oilfield operations, such as formation structure, geological stratigraphy, core sampling, well logging, density, resistivity, fluid composition, flow rate, downhole condition, surface condition, equipment condition, or other aspects of the oilfield operations. The data is processed by the processing module (442) into multiple volume data sets for storage and retrieval.

The data repository (434) may store the data for the modeling unit (448). The data may be stored in a format available for use in real-time (e.g., information is updated at approximately the same rate the information is received). The data is generally passed to the data repository (434) from the processing modules (442). The data can be persisted in the file system (e.g., as an extensible markup language (XML) file) or in a database. The system determines which storage is the most appropriate to use for a given piece of data and stores the data in a manner to enable automatic flow of the data through the rest of the system in a seamless and integrated fashion. The system also facilitates manual and automated workflows (such as Modeling, Geological & Geophysical workflows) based upon the persisted data.

The data rendering unit (436) performs a rendering algorithm calculation to provide one or more displays for visualizing the data. The displays may be presented to a user at the display unit (416). The data rendering unit (436) may contain a 2D canvas, a 3D canvas, a well section canvas or other canvases as desired. The data rendering unit (436) may selectively provide displays composed of any combination of one or more canvases. The canvases may or may not be synchronized with each other during display. The data rendering unit (436) may be provided with mechanisms for actuating various canvases or other functions in the system. Further, the data rendering unit (436) may selectively provide displays composed of any combination of one or more volume data sets. The volume data sets typically contain exploration and production data, such as that shown in FIGS. 2.1-2.4.

The modeling tool (408) performs the key modeling functions for the evaluation of a volcanic reservoir formation as described in detail in FIGS. 5.1-5.7 below.

While specific components are depicted and/or described for use in the units and/or modules of the modeling tool (408), it will be appreciated that a variety of components with various functions may be used to provide the formatting, process-ing, utility and coordination functions necessary to provide processing in the modeling tool (408). The components may have combined functionalities and may be implemented as software, hardware, firmware, or combinations thereof.

Further, components (e.g., the processing modules (442) and the data rendering unit (436)) of the modeling tool (408) may be located in an onsite server (422) or in distributed locations where remote server (424) and/or third party server (426) may be involved. The onsite server (422) may be located within the surface unit (402).

FIG. 5.1 shows a workflow for evaluating a volcanic reservoir formation based on the use of multiple discipline-specific evaluations in accordance with one or more embodiments of evaluating a reservoir formation. The volcanic reservoir formation may be evaluated in a hydrocarbon-in-place evaluation study. These multiple discipline-specific evaluations may use, for example complimentary well logging measurements, each of which has particular sensitivity to aspects of the rock matrix, pore network geometry, or contained fluids. These well logging measurements may be performed using the logging while drilling tool of FIG. 1.2, the wireline logging tool of FIG. 1.3, and/or the production tool conveyed through the borehole of FIG. 1.4. These well logging measurements may also be supplemented with comprehensive core sample measurements of FIG. 2.2.

As shown in FIG. 5.1, the workflow is based on logging measurements for a volcanic reservoir formation and includes determining lithology (block 501), determining porosity (block 503), determining pore network geometry (block 505) and permeability (block 507), determining fluid saturations (block 509), and generating evaluation of the volcanic reservoir formation (block 511). The workflow blocks shown in FIG. 5.1 may use neutron capture spectroscopy measurement, magnetic resonance measurement, borehole electrical images, and array laterolog measurements, in combination with traditional triple-combo logging measurements. These measurements may come from the Elemental Capture Spectroscopy (ECS) tool, the Combinable Magnetic Resonance (CMR) tool, the Formation Micro Imager (FMI) tool, and/or the High-Resolution Laterolog Array (HRLA) tool. These various tools may be part of the logging while drilling tool, the wireline tool, and/or the production tool conveyed through the borehole as described above. More details of the workflow blocks are described with respect to FIGS. 5.2-5.7 below. Those skilled in the art, having the benefit of this detailed description, will appreciate other tools providing similar measurements may be substituted in the configurations described in FIGS. 1.1-1.4.

FIGS. 5.2 and 5.3 depict details of the block 501 described with respect to FIG. 5.1 above. FIG. 5.2 shows a flowchart for determining the lithology of a volcanic reservoir formation based on logging measurements. Lithology in volcanic rocks may be considered a function of composition and texture. Compositionally, volcanic rocks can be classified as rhyolites, dacites, or basalts, for example using the Total Alkalis versus Silica (TAS) classification scheme defined by the International Union of Geological Science (IUGS) (block 502). Details of block 502 regarding applying a TAS classification scheme to a volcanic reservoir formation based on logging measurements are described in FIG. 5.3 below. Furthermore, texture may also be a useful element to the classification of volcanic rocks. From chemistry alone, a rhyolite and a rhyolitic tuff are identical, although in practice they are quite different rocks. Therefore, rock texture description is obtained in volcaniclastic rocks (block 504) to provide a second axis to the rock classification problem. Information on the texture of a rock, such as size of the particles making up the rock, degree of variation in particle size, etc. may be determined from measurements such as FMI borehole images and Nuclear Magnetic Resonance Transversal Relaxation Time (NMR T2) distributions. One or more embodiments of evaluating a reservoir formation use borehole images and T2 distributions to provide a texture-based classification of volcanic rocks.

In one or more embodiments of evaluating a reservoir formation, both compositional and textural descriptions are integrated to produce a comprehensive classification of volcanic rock type in terms of lithology (block 506). In one or more embodiments of evaluating a reservoir formation, this integrated classification is performed using a neural network-based approach. Those skilled in the art, having the benefit of this detailed description, will appreciate other approaches to this integrated classification are possible.

Volcanic rocks are formed from lava either very close to or at the earth's surface. This lava cools much more rapidly than in equivalent plutonic rocks from deep under the earth's surface. This leads to the formation of very fine mineral crystals and, with very rapid quenching, volcanic glass. The very fine crystalline nature of volcanic rocks prevents evaluation of their mineralogy by use of conventional techniques. This combined with the presence of varying amount of volcanic glass, which does not have a crystalline structure, means that volcanic rocks can not be classified on the basis of their mineralogy.

The standard classification scheme for fine-grained igneous rocks (e.g., volcanic rocks) is the Total Alkalis versus Silica (TAS) classification scheme defined by the International Union of Geological Science (IUGS). The volcanic rocks typically contain sodium and potassium in larger concentrations than siliciclastics and carbonates. The primary TAS classification is based on a comparison of silica ($SiO_2$) versus total alkalis ($Na_2O+K_2O$). Further subdivision is based on aluminum oxide ($Al_2O_3$) and iron oxide ($FeO/Fe_2O_3$). This scheme is routinely applied to the classification of volcanic rocks by use of geochemical analyses to obtain chemical compositions of samples from outcrops or cores, which is not practical for generating a continuous evaluation penetrating the volcanic formation.

A variety of logging techniques, including the neutron capture spectroscopy described in U.S. Pat. No. 5,471,057 may be used to obtain relative yields information relating to relative element concentrations in a continuous manner along a borehole penetrating the reservoir formation. A neutron capture spectroscopy tool measures the energy spectrum of gamma rays generated by a variety of interactions between neutrons and atomic nuclei in the environment of the tool. This spectrum represents a composite of various different interactions taking place in the borehole environment where the tool traverses. Although the concentrations of the rock forming elements silicon, iron, titanium, calcium and sulfur are routinely measurable due to the combination of their typical concentration levels, good measurement sensitivity, and/or spectral characteristics allowing for unambiguous determination under common logging conditions, the rock forming elements aluminum, sodium, and potassium cannot typically be measured reliably due to their typical concentration levels, measurement sensitivities, and/or spectral characteristics. Aluminum, sodium, and potassium are significant elements in volcanic rocks and, along with silicon and iron, are considered for application of the TAS classification scheme.

In addition, a spectral stripping process in neutron capture spectroscopy only provides the relative yields for each element present. The absolute element concentration is obtained through application of an oxides closure model, which accounts for the proportion of unmeasured elements (e.g., oxygen) in the formation in the conversion of relative yields to absolute element concentrations. An oxides closure model is specific to the elements included in the model, and incorporates knowledge about relationships between the concentrations of these measured elements and other unmeasured elements. The concentrations of rock-forming elements in volcanics, and the relationships between the concentrations of different elements, are quite different to those in typical siliciclastic rocks. Although universally applicable to sandstone reservoirs and carbonate reservoirs, the standard oxides closure models can not be used in volcanic formation environments since they do not take into account the contributions from sodium, potassium and aluminum. Furthermore, each of the different volcanic reservoirs may have varying chemical compositions different enough to use a custom oxides closure model unique to the particular volcanic reservoir formation.

FIG. 5.3 depicts details of the block 502 described with respect to FIG. 5.2 above. FIG. 5.3 shows a flowchart for applying a TAS classification scheme to a volcanic reservoir formation based on logging measurements in accordance with one or more embodiments of evaluating a reservoir formation.

One or more embodiments of evaluating a reservoir formation utilize chemical concentration data from the ECS tool as input for the TAS classification scheme, allowing for a continuous compositional characterization from logging data.

One or more embodiments of evaluating a reservoir formation relates to the development and use of a transform relating neutron capture spectroscopy relative yields to absolute element concentrations in volcanic rocks. As shown in FIG. 5.3, a custom oxides closure model is constructed by performing geochemical analyses on core samples obtained in a volcanic reservoir formation (block 508). For example, absolute element concentrations including contributions from sodium, potassium and aluminum are measured based on core samples. Projected relative yields are then computed from the absolute element concentrations, again including the contributions from sodium, potassium and aluminum. Generally, more than one set of absolute element concentrations may correspond to the same relative yields in a many to one relationship. A custom oxide closure model specific to the volcanic reservoir formation may be formulated as the inverse transform of this many to one relationship in the form of a system of equations having empirical coefficients, which are unique to the particular volcanic reservoir formation from which the core samples are obtained. The custom oxide closure model allows the absolute element concentrations of volcanic rock forming elements including aluminum, sodium, and potassium to be determined from measured relative yields in well logs.

To allow relative yields of volcanic rock forming elements of aluminum, sodium, and potassium to be measured by neutron capture spectroscopy in well logging, the borehole and tool environment are controlled (block 510). For example, chlorine has a very large neutron capture spectroscopy response, and so the presence of large amounts of chlorine, such as in the drilling mud, can cause chlorine to dominate the measured signal. Maintaining the borehole salinity at a low level, such as less than 5 parts per thousand (ppk) would minimize the chlorine contribution, allowing for a greater contribution to the gamma ray energy spectrum by elements making up the rock matrix. In addition, the presence of barite used in the drilling mud may cause distortion of the measured spectra, therefore minimizing the use of barite removes the possibility of spectral distortion. Other operational controls to maximize data quality include ensuring the detectors in the neutron capture spectroscopy tool are kept cool to maximize their spectral resolution, ensuring the neutron capture spectroscopy tool is centered in the borehole to minimize further the amount of drilling mud between the tool and the formation, and running the tool slowly to maximize the statistical precision of the measurements. Therefore in this situation it is possible to extend the suite of measurable rock forming elements to apply neutron capture spectroscopy to volcanic reservoir formation containing aluminum, sodium, and potassium.

Using the custom oxides closure model described above, continuous absolute concentrations of elements pertaining to TAS classification (i.e., silicon, aluminum, iron, sodium, and potassium) may be determined from neutron capture spectroscopy measurements based on well logging data. (block 512). The continuous absolute element concentrations from neutron capture spectroscopy logging measurements may then be applied to the TAS classification scheme to provide a continuous classification of the lithology from well logs (block 514).

The acidic volcanic lithologies consist of potassium feldspar and sodium plagioclase, with lesser amounts of quartz. Other minerals present in significant proportions include micas, amphiboles, and heavy minerals such as ilmenite, magnetite, and apatite. Variable amounts of volcanic glass are also present. In the more mafic volcanic lithologies, calcium plagioclase becomes more significant at the expense of sodium plagioclase, and amphiboes, pyroxenes and olivines become more significant. The complex and variable mineralogy leads to significant variations in matrix properties, such as matrix density. Determination of matrix properties used for porosity calculation has proven to be problematic in volcanic reservoir formations. The matrix density (represented as $\rho_{ma}$) calculation established for siliciclastic rocks is in the form of $\rho_{ma}$=a+bSi+cCa+dFe+e S (where Si, Ca, Fe, S represents chemical concentrations of silicon, calcium, iron, and sulfur) and is not applicable to volcanic reservoir formations due to lack of consideration for contributions from volcanic rock forming elements of sodium, potassium, and aluminum. A matrix-independent porosity approach, such as available with magnetic resonance measurements, may be used but is not viable due to the presence of gas in the formation.

One or more embodiments of evaluating a reservoir formation relate to directly calculating properties such as matrix density from chemical compositions in volcanic reservoir formations. In this case, a transform customized for volcanic rocks to compute matrix density from chemical composition may be used. Further, a method for developing the transform may include measuring chemical composition and grain density of rock samples, modeling matrix nuclear properties such as matrix density using these data, and then defining transforms between chemistry and matrix properties based on the measured chemistry and modeled properties. From these transforms it is possible to compute a matrix density continuously from ECS chemical composition data. This matrix density may then be used with conventional bulk density and magnetic resonance porosity measurements using the DMRP method to compute total porosity corrected for both matrix and fluid effects.

FIG. 5.4 is a flowchart for determining the porosity of a volcanic reservoir formation in accordance with one or more embodiments of evaluating a reservoir formation. Initially, volcanic reservoir formation core samples from a variety of lithologies are subject to a series of analytical procedures, including grain density and chemical composition measurements and mineralogical analysis (block 516). For example, the chemical composition may be measured by using a combination of x-ray fluorescence, inductively coupled plasma mass spectrometry, and neutron activation. In another example, the mineralogical analysis may be performed by using Fourier transform infra-red spectroscopy or x-ray diffraction.

Through nuclear parameter modeling, matrix nuclear properties such as matrix density, photoelectric factor, hydrogen index, thermal and epithermal neutron porosity index, and capture cross-section can be calculated from the measured grain density and chemical composition (block 518). Multiple linear regression techniques may then be applied to emulate the nuclear parameter modeling by a series of custom matrix property transforms based on the core sample measurements and the nuclear parameter modeling results (block 520). These custom matrix property transforms may be used to compute matrix nuclear properties (e.g., matrix density) directly from the absolute element concentrations of volcanic rock forming elements determined, for example using the method described with respect to FIG. 5.3 above. This computation using the custom matrix property transforms may be automated and applicable to well logging for obtaining continuous matrix density along the length of the borehole.

Figure 6:
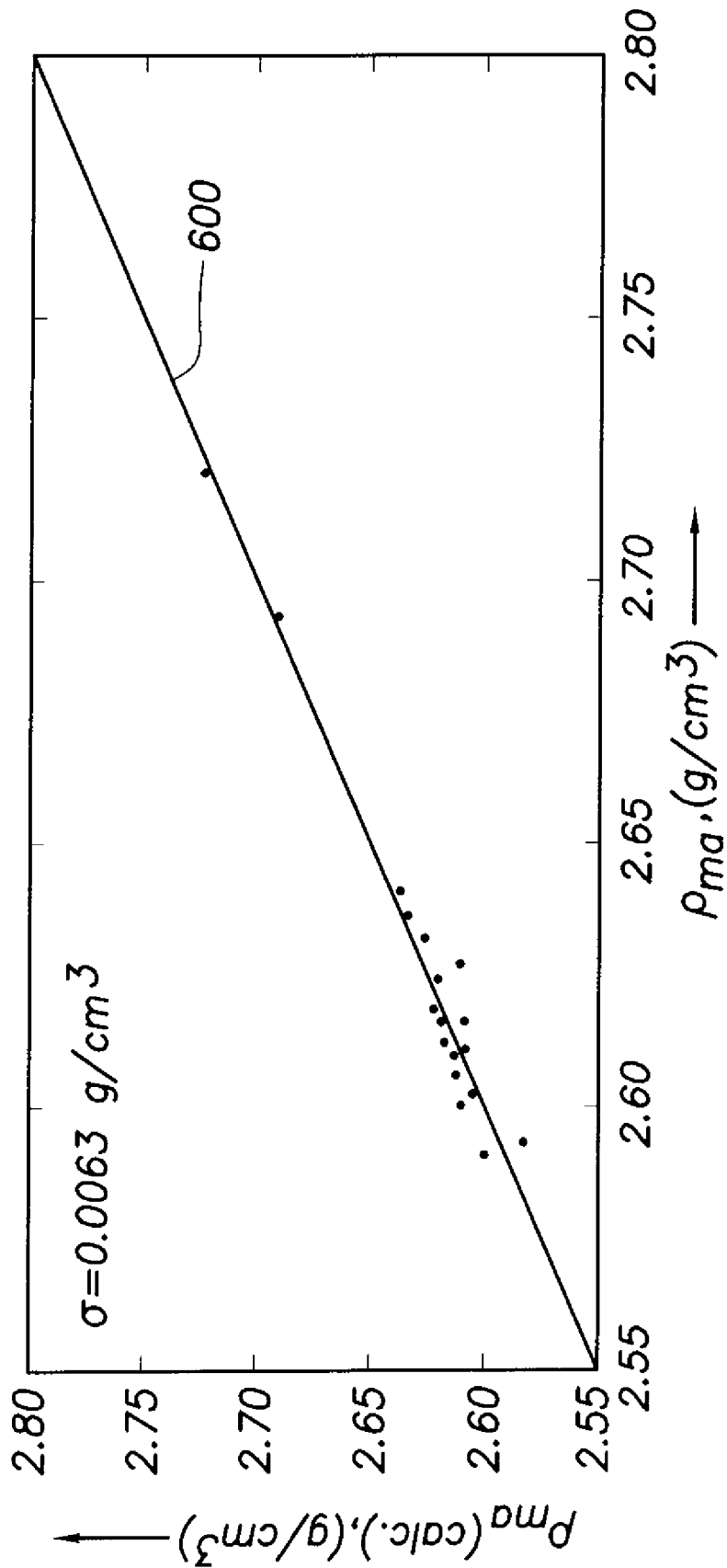
FIG. 6 shows a data plot in accordance with one or more embodiments of evaluating a reservoir formation.

An example of these custom matrix property transforms is in the form of $\rho_{ma}$=3.1475−1.1003*Si−0.9834*Ca−2.4385*Na−2.4082*K+1.4245*Fe−11. 3100*Ti where Si, Ca, Na, K, Fe, Ti represent chemical concentrations of silicon, calcium, sodium, potassium, iron, and titanium. FIG. 6 shows a comparison of matrix density obtained using the nuclear parameter modeling ($\rho_{ma}$ shown in x-axis) and the matrix density derived from the example custom matrix property transform ($\rho_{ma}$(calc) shown in y-axis). The dots represent sample measurements from the rock samples; the straight line (600) represents exact match between $\rho_{ma}$(calc) and $\rho_{ma}$, and σ represents the standard deviation from the exact match.

As described above, the borehole environment may be controlled to allow relative yields of volcanic rock forming elements of aluminum, sodium, and potassium to be measured by neutron capture spectroscopy in well logging (block 521). The absolute element concentrations determined from the relative yield (e.g., using the methods described with respect to FIG. 5.3 above) may then be used to determine the matrix density using the custom matrix property transforms (block 522).

Once the matrix density is determined, the porosity and gas saturation may be calculated as detailed below using the matrix density, bulk density and magnetic resonance porosity (block 524). The gas saturation in the invaded zone is an excellent indicator of hydrocarbon-bearing zones. In a gas-bearing formation, the combination of density and magnetic resonance porosity measurements is based on the complimentary effects of gas on both density and magnetic resonance measurements, as well as leveraging the lithology-independent nature of the magnetic resonance porosity measurement. In one or more embodiments of evaluating a reservoir formation, the method is based on the tool response equations for density and magnetic resonance porosity in a gas-bearing formation invaded with water based mud filtrate.

$$\rho_b = (1-\phi)\cdot\rho_{ma} + \phi\cdot S_{xo}\cdot\rho_{mf} + \phi\cdot(1-S_{xo})\cdot\rho_g$$

$$\phi_{MR} = \phi\cdot S_{xo}\cdot HI_{mf} + \phi\cdot(1-S_{xo})\cdot HI_g\cdot P_g$$

where $$P_g = 1 - e^{-\frac{PT}{T/g}}$$

Here $\rho_b$, $\phi$, $\rho_{ma}$, $S_{XO}$, $\rho_{mf}$, $\rho_g$, $\phi_{MR}$, $HI_{mf}$, $HI_g$, $P_g$, PT, and $Tl_g$ represent bulk density, porosity, matrix density, water saturation in near well bore region (i.e., the invaded zone), mud filtrate density, gas density, magnetic resonance porosity, hydrogen index for mud filtrate, hydrogen index for gas, polarization factor of gas, polarization time, and alignment half life of gas, respectively.

FIG. 5.5 shows a flowchart for determining the pore network geometry and matrix permeability of a volcanic reservoir formation in accordance with one or more embodiments of evaluating a reservoir formation. Matrix pore network geometry in volcanic reservoirs can be very complicated, ranging from microporosity to macroporosity. The pore network geometry may be similar to some complex carbonate reservoirs. As shown in FIG. 5.5, initially the NMR T2 distribution of a volcanic reservoir formation is obtained (block 526). A total porosity of the volcanic reservoir formation is then subdivided into microporous, mesoporous, and macroporous fractions based on the NMR T2 distributions (block 528). Optionally, the borehole micro-resistivity images may be used to confirm the proportion of large pores in the rock (block 529). Furthermore, in pore systems dominated by microporosity or mesoporosity, permeability may be estimated from magnetic resonance measurements using the first equation detailed below. Where significant macroporosity is present, permeability may be estimated based on the second equation detailed below. Both of these equations are generally applied to carbonates reservoirs:

$$k_{SDR} = A_{k_{SDR}} \cdot \phi^{B_{k_{SDR}}} \cdot (\rho_2 \cdot T2LM)^{C_{k_{SDR}}}$$

$$k_{macro} = A_{k_{macro}} \cdot \phi^{B_{k_{macro}}} \cdot \left(\frac{V_{macro}}{\phi - V_{macro}}\right)^{C_{k_{macro}}}$$

Here, $k_{SDR}$, $A_{kSDR}$, $\phi$, $B_{kSDR}$, $\rho_2$, T2LM, $C_{kSDR}$, $k_{macro}$, $A_{kmacro}$, $B_{kmacro}$, $V_{macro}$, $C_{kmacro}$ represents permeability from the SDR equation, coefficient A in the SDR permeability equation, porosity, coefficient B in the SDR permeability equation, transverse surface relaxivity, log mean of the T2 distribution, coefficient C in the SDR permeability equation, permeability from the macro permeability equation, coefficient A in the macro permeability equation, coefficient B in the macro permeability equation, volume of macroporosity, and coefficient C in the macro permeability equation, respectively. Here SDR refers to Schlumberger-Doll Research where the SDR equation was developed. These equations are applied to volcanic reservoirs based on the similarity of its pore network as compared to that of carbonates reservoirs. However, the volcanic reservoir rocks may generally have similar mineralogy, and hence magnetic resonance properties, to siliciclastic rocks. Therefore, the parameters of these equations are substituted with parameters more appropriate to silicicalstics (block 530).

FIG. 5.6 shows a flowchart for determining the pore network geometry and fracture permeability of a volcanic reservoir formation in accordance with one or more embodiments of evaluating a reservoir formation. Due to the generally poor reservoir quality in volcanic reservoirs, natural fractures can be of significant importance in overall reservoir performance. Evaluation of fracture aperture and orientation allows for the determination of fracture porosity and permeability, the combination of these with matrix porosity and permeability allows for a complete characterization of the pore network geometry. As shown in FIG. 5.6, initially, fracture orientation information is obtained, for example based on FMI borehole images (block 532). The FMI borehole images may also be used to determine fracture aperture, which is a manual identification of each fracture feature. In highly fractured intervals, an improved methodology that is not dependent on this manual identification is the use of array laterolog measurements from the HRLA tool (block 534). In fractured reservoirs, separation between laterolog curves is a function of fracture aperture. One or more embodiments of evaluating a reservoir formation include the application of FMI and HRLA in volcanic reservoirs to determine fracture aperture and orientation and consequently fracture porosity and permeability (block 536). Accordingly, the total system porosity and permeability may then be determined by combining the contributions from the matrix as well as the fractures (block 538).

FIG. 5.7 shows a flowchart for determining fluid saturations in a volcanic reservoir formation in accordance with one or more embodiments of evaluating a reservoir formation. Evaluating fluid saturations from resistivity is extremely complex in volcanic reservoirs. In one or more embodiments of evaluating a reservoir formation, a resistivity-independent approach is used to determine saturation through capillary pressure—saturation relationships. Such relationships can be derived from NMR T2 distributions. Therefore, from NMR T2 distributions corrected for apparent porosity deficit caused by gas in the measurement volume, with calibration of the relationship to core measurements if available, continuous evaluation of capillary pressure versus saturation relationships is possible. With knowledge of the pressure distribution in the reservoir, from distributed pressure measurements with wireline formation testers or other information, it is then possible to determine water saturation continuously. One or more embodiments of evaluating a reservoir formation include the correction of the T2 distributions for the gas effect and evaluation of capillary pressure-saturation relationships from NMR T2 distributions, with calibration to core as available, and use of these relationships to determine fluid saturations.

As shown in FIG. 5.7, initially, the NMR T2 distribution is obtained from volcanic reservoir formation (block 540). Then NMR T2 distribution is corrected based on porosity and gas saturation, for example the volume of invaded zone gas as determined from the density-magnetic resonance porosity computation (block 542). A transform is selected for relating NMR T2 distribution to capillary pressure as the equation below (block 544).

$$P_c = \frac{1}{T2} \cdot \left(1 + \left(\frac{a}{b \cdot T2 + 1}\right)^c\right) \cdot \frac{d}{k}$$

Here $P_c$ represents capillary pressure, T2 represents NMR T2 measurement, and a, b, c, and d represent fitting parameters, and k represents permeability.

The fitting parameters may be calibrated by comparing the NMR T2 distributions with corresponding core mercury injection capillary (MICP) curves to allow for core-to-log depth matching errors (block 546). The calibration may be performed in multiple iterations to achieve a global set of fitting parameters for use in the transform. The transform may then be used to convert the NMR T2 distributions obtained in well logging to pseudo-capillary curves providing a continuous evaluation of capillary behavior (block 548).

The buoyancy pressure distribution is commonly determined using wireline measurements. Where distributed pressure measurements are available, they may be used to determine buoyancy pressure distribution. In some volcanic reservoir formations, this method may not be used due to poor reservoir quality. Alternatively, the volcanic reservoir may be modeled as a single pressure system with connectivity provided through natural fractures on a geological time scale. A buoyancy pressure distribution may then be determined in this model (block 550). Based on this model, a single free water level (FWL) may also be determined in an iterative process. First the elevation of the lowest known gas in the field is determined. Starting at this elevation and moving progressively deeper, water saturation in each of the wells is computed and compared to indications of gas distribution from the density-magnetic resonance porosity evaluation, magnetic-resonance based direct hydrocarbon detection methods, downhole fluid analysis conducted with wireline testers, and production tests. Ultimately a FWL elevation is determined that is consistent with observed fluid distribution data. This elevation may then be used to determine final water saturations from the pseudo-capillary pressure curves (block 552).

As FIGS. 5.1-5.7 are all focused on evaluating reservoir formations, portions of one or more blocks from any of FIGS. 5.1-5.7 may be combined in various orders to form an overall process for evaluating reservoir formations. Further, the portions of the blocks may be implemented as software, hardware, firmware, or combinations thereof.

Evaluating a reservoir formation may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, evaluating a reservoir formation may be implemented on a distributed system having a plurality of nodes, where each portion of the system may be located on a different node within the distributed system. In one embodiment of evaluating a reservoir formation, the node corresponds to a computer system. Alternatively, the node may correspond to a processor with associated physical memory. The node may alternatively correspond to a processor with shared memory and/or resources. Further, software instructions to perform embodiments of evaluating a reservoir formation may be stored on a computer readable medium such as a compact disc (CD), a diskette, a tape, a file, or any other computer readable storage device.

The systems and methods provided relate to acquisition of hydrocarbons from an oilfield. It will be appreciated that the same systems and methods may be used for performing subsurface operations, such as mining, water retrieval and acquisition of other underground materials. Further, the portions of the systems and methods may be implemented as software, hardware, firmware, or combinations thereof.

While evaluating a reservoir formation has been described with respect to a limited number of embodiments, those skilled in the art, having benefit of this disclosure, will appreciate that other embodiments can be devised which do not depart from the scope of evaluating a reservoir formation as disclosed herein. Accordingly, the scope of evaluating a reservoir formation should be limited only by the attached claims.

What is claimed is:

1. A method for evaluating a volcanic reservoir formation having volcanic rock forming elements and a borehole penetrating the volcanic reservoir formation, comprising:
controlling chlorine concentration in an environment of the borehole and a tool operation, by at least maintaining salinity within the borehole to be less than a pre-determined level, to enable neutron capture spectroscopy measurements of at least aluminum, potassium, and sodium of the volcanic rock forming elements;
obtaining neutron capture spectroscopy data relating to the at least aluminum, potassium, and sodium of the volcanic rock forming elements from borehole logging tools;
determining a lithology of the volcanic reservoir formation based on at least the neutron capture spectroscopy data; and
generating an evaluation of the volcanic reservoir formation based on at least the lithology.

2. The method of claim 1, wherein determining the lithology comprises:
determining absolute element concentrations of the volcanic rock forming elements from the neutron capture spectroscopy data using a custom oxides closure model; and
generating a total alkalis versus silica (TAS) classification of the volcanic reservoir formation based on the absolute element concentrations of the volcanic rock forming elements.

3. The method of claim 2, wherein determining the lithology further comprises:
obtaining measured absolute element concentrations of the volcanic rock forming elements from core sample measurements;
calculating relative yields of the volcanic rock forming elements from the absolute element concentrations of the volcanic rock forming elements; and
generating the custom oxides closure model representing the measured absolute element concentrations of the volcanic rock forming elements as a function of the relative yields of the volcanic rock forming elements, wherein the custom oxides closure model comprises empirical coefficients unique to the volcanic reservoir formation.

4. The method of claim 2, wherein determining the lithology further comprises:
generating a compositional description of the volcanic reservoir formation based on the TAS classification;
generating a textural description of the volcanic reservoir formation based on a borehole micro-resistivity image and a nuclear magnetic resonance (NMR) transversal relaxation time (T2) distribution; and
integrating the compositional description and the textural description using a neural network-based approach.

5. The method of claim 1, further comprising displaying the evaluation.

6. The method of claim 1, further comprising using the evaluation to obtain at least one selected from a group consisting of a fluid and a mineral associated with the volcanic reservoir formation.

7. A computer readable medium storing instructions for evaluating a volcanic reservoir formation having volcanic rock forming elements and a borehole penetrating the volcanic reservoir formation, the instructions comprising functionality for:

generating a custom matrix property transform unique to the volcanic reservoir formation, wherein the custom matrix property transform comprises relationships between matrix nuclear properties of the volcanic reservoir formation and absolute element concentrations of the volcanic rock forming elements;

determining porosity of the volcanic reservoir formation using at least the custom matrix property transform, comprising:

controlling chlorine concentration in an environment of the borehole, by at least maintaining salinity within the borehole to be less than a pre-determined level, to enable neutron capture spectroscopy measurements of at least aluminum, potassium, and sodium of the volcanic rock forming elements; and generating an evaluation of the volcanic reservoir formation based on at least the porosity.

8. The computer readable medium of claim 7, wherein generating the custom matrix property transform comprises:

obtaining grain density and absolute element concentrations from core sample measurements;

determining matrix nuclear properties from the grain density and the absolute element concentrations using nuclear parameter modeling; and generating empirical equations representing the matrix nuclear properties as a function of the absolute element concentrations of the volcanic rock forming elements, wherein the empirical equations comprise empirical coefficients unique to the volcanic reservoir formation.

9. The computer readable medium of claim 7, wherein determining porosity of the volcanic reservoir formation comprises:

obtaining neutron capture spectroscopy data relating to the volcanic rock forming elements from borehole logging tools;

determining absolute element concentrations of the volcanic rock forming elements from the neutron capture spectroscopy data;

calculating a matrix density from the absolute element concentrations of the volcanic rock forming elements using the custom matrix property transform; and calculating the porosity using the matrix density, a bulk density, and a magnetic resonance porosity (MPR) of the volcanic reservoir formation.

10. The computer readable medium of claim 7, wherein the instructions further comprise functionality for displaying the evaluation.

11. The computer readable medium of claim 7, wherein the instructions further comprise functionality for using the evaluation to obtain at least one selected from a group consisting of a fluid and a mineral associated with the volcanic reservoir formation.

12. The computer readable medium of claim 7, wherein the instructions further comprise functionality for partitioning a pore volume of the volcanic reservoir formation into a plurality of fractions, wherein each of the plurality of fractions is associated with a pore class, the pore class being at least one selected from a group consisting of a microporous class, a mesoporous class, and a macroporous class;

estimating the permeability using at least one of the plurality of fractions, and generating the evaluation of the volcanic reservoir formation further based on the permeability.

13. The computer readable medium of claim 12, wherein at least one of the plurality of fractions is associated with the macroporous class, and wherein the permeability is estimated based on substituting a siliciclastic rock parameter in a carbonate reservoir permeability equation.

14. The computer readable medium of claim 7, wherein the instructions further comprise functionality for determining an orientation of a fracture in the volcanic reservoir formation;

determining an aperture of the fracture; and estimating the permeability further based on the orientation of the fracture, the aperture of the fracture, and matrix permeability of the volcanic reservoir formation.

15. The computer readable medium of claim 7, wherein the instructions further comprise functionality for obtaining a transform relating capillary pressure to a first nuclear magnetic resonance (NMR) transversal relaxation time (T2) distribution;

determining a capillary pressure curve using the transform and a second NMR T2 distribution;

determining a buoyancy pressure distribution associated with the volcanic reservoir formation;

determining the fluid saturation by applying the buoyancy pressure distribution to the capillary pressure curve; and generating the evaluation of the volcanic reservoir formation further based on the fluid saturation.

16. The computer readable medium of claim 15, wherein the transform is calibrated using a core mercury injection capillary pressure (MICP) curve.

17. The computer readable medium of claim 15, wherein the second NMR T2 distribution is associated with the volcanic reservoir formation and corrected based on a gas saturation associated with the volcanic reservoir formation.

18. A system for evaluating a volcanic reservoir formation having volcanic rock forming elements and a borehole penetrating the volcanic reservoir formation, comprising:

a surface unit for collecting neutron capture spectroscopy data relating to at least aluminum, potassium, and sodium of the volcanic rock forming elements from borehole logging tools, chlorine concentration in an environment of the borehole and a tool operation being controlled, by at least maintaining salinity within the borehole to be less than a pre-determined level, to enable neutron capture spectroscopy measurements of the at least aluminum, potassium, and sodium of the volcanic rock forming elements;

a modeling tool operatively linked to the surface unit, the modeling tool comprising functionality for generating an evaluation of the volcanic reservoir formation from the neutron capture spectroscopy data relating to the volcanic rock forming elements using a custom oxides closure model; and a drilling system operatively linked to the surface unit for retrieving target fluid in the volcanic reservoir formation, the drilling system being selectively adjusted based on the evaluation.

19. The system of claim 18, wherein the modeling tool further comprises functionality for:

determining absolute element concentrations of the volcanic rock forming elements from the neutron capture spectroscopy data using the custom oxides closure model; and generating a total alkalis versus silica (TAS) classification as the evaluation of the volcanic reservoir formation based on the absolute element concentrations of the volcanic rock forming elements.

20. The system of claim 18, wherein the modeling tool further comprises functionality for:

obtaining measured absolute element concentrations of the volcanic rock forming elements from core sample measurements;

calculating relative yields of the volcanic rock forming elements from the absolute element concentrations of the volcanic rock forming elements; and generating the custom oxides closure model representing the measured absolute element concentrations of the volcanic rock forming elements as a function of the relative yields of the volcanic rock forming elements, wherein the custom oxides closure model comprises empirical coefficients unique to the volcanic reservoir formation.

* * * * *